US007180985B2

(12) United States Patent
Colson et al.

(10) Patent No.: US 7,180,985 B2
(45) Date of Patent: Feb. 20, 2007

(54) INTERACTIVE VOICE RESPONSE (IVR) AGGREGATION MASTER SERVICE

(75) Inventors: Vicki L. Colson, Tavernier, FL (US); Thomas E. Creamer, Boca Raton, FL (US); Brent L. Davis, Deerfield Beach, FL (US); Peeyush Jaiswal, Deerfield Beach, FL (US); Victor S. Moore, Deerfield Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 10/649,052

(22) Filed: Aug. 27, 2003

(65) Prior Publication Data

US 2005/0047559 A1 Mar. 3, 2005

(51) Int. Cl.
*H04M 11/00* (2006.01)

(52) U.S. Cl. ................................ 379/88.16; 379/88.18

(58) Field of Classification Search ............... 379/67.1, 379/74, 88.16, 88.17, 88.18, 201.01, 93.01, 379/93.12

See application file for complete search history.

(56) References Cited

U.S. PATENT DOCUMENTS

| | | | | |
|---|---|---|---|---|
| 5,737,393 A | | 4/1998 | Wolf | 379/88.22 |
| 5,915,001 A | * | 6/1999 | Uppaluru | 379/88.22 |
| 5,946,377 A | | 8/1999 | Wolf | 379/88.13 |
| 6,173,042 B1 | | 1/2001 | Wu | 379/88.04 |
| 6,229,880 B1 | * | 5/2001 | Reformato et al. | 379/88.01 |
| 6,366,658 B1 | | 4/2002 | Bjornberg et al. | 379/221.08 |
| 6,421,427 B1 | | 7/2002 | Hill et al. | 379/88.14 |
| 6,460,057 B1 | | 10/2002 | Butler et al. | 715/500.1 |

* cited by examiner

*Primary Examiner*—Ovidio Escalante
(74) *Attorney, Agent, or Firm*—Akerman Senterfitt

(57) ABSTRACT

A method of aggregating interactive voice response services from a plurality of interactive voice response systems can include, for at least one caller, storing service information for a plurality of services within an interactive voice response system. Each service can be accessible through a corresponding one of the plurality of interactive voice response systems. The method further can include receiving a call from the caller and receiving an input from the caller over the call, wherein the input identifies at least one of the plurality of services and corresponding interactive voice response systems. The method also can include accessing the interactive voice response system corresponding to the identified service on behalf of the caller, retrieving information from the interactive voice response system, and providing the retrieved information to the caller.

9 Claims, 3 Drawing Sheets

INTERACTIVE VOICE RESPONSE (IVR) AGGREGATION MASTER SERVICE

BACKGROUND

1. Field of the Invention

This invention relates to the field of interactive voice response systems.

2. Description of the Related Art

An interactive voice response (IVR) system serves as a front end interface through which a calling party or caller can access data processing systems. The IVR system can provide prompts to the caller and receive touch tone and/or spoken responses from the caller. Through prompt/response interaction, the IVR system collects sufficient information about the caller to direct the inbound call to an appropriate resource, query an information processing system, or the like.

For example, an IVR system typically includes a hierarchical menu formed of an ordered series of audio prompts, whether recorded audio and/or text-to-speech programming. Each prompt is associated with a listing of choices available to the caller at that particular location within the menu hierarchy. The caller can navigate the menu hierarchy by making selections using touch tones and/or speech. Responsive to a caller input, the IVR system traverses the menu hierarchy to the particular selection that was chosen or indicated by the caller's input. In this manner, the IVR system enables the caller to traverse the menu hierarchy to reach a particular service or feature that is of interest to the caller.

As noted, IVR systems can function as audio interfaces for a variety of different information processing systems. For example, IVR systems can be used to automate caller access to financial accounts such as bank accounts, credit card accounts, and/or retirement accounts. IVR systems also can automate caller access to telephone directories, automated purchase systems, home shopping systems, bill payment systems, and the like.

As such, many persons interact with one or more different IVR systems on a day to day basis, whether checking on one's 401K or verifying a balance of a checking account. In fact, to perform routine tasks as listed above, callers on average deal with at least four different IVR systems as each task typically is performed by a different IVR system.

In order access the functionality of each respective IVR system, the caller must remember a different telephone number for each IVR system or service the caller wishes to access. The caller must also remember a corresponding account number for each respective IVR system as well as corresponding user identifiers (ID's) and/or passwords. Moreover, the caller must remember the particular menu structure used by each IVR system to efficiently navigate the menu hierarchy of the called IVR system to retrieve information desired by the caller.

SUMMARY OF THE INVENTION

The present invention provides a solution for aggregating interactive voice response (IVR) services under a centralized system. More particularly, the present invention provides a master IVR service through which a caller can access several different IVR systems. The caller can register with the master IVR service and provide access information for one or more IVR systems. After registering with the master IVR service, the caller need only recall the access number and logon information for the master IVR service. Once the caller is logged on to the master IVR service, the caller can access any other IVR systems which the caller has registered with the master IVR service. That is, the master IVR service can log the caller into other IVR systems, forward caller queries to the IVR systems, and retrieve information from the IVR systems to relay back to the caller.

One aspect of the present invention can include a method of aggregating interactive voice response services from one or more interactive voice response systems. The method can include, for at least one caller, storing service information for one or more services within an interactive voice response system. Each service can be accessible through a corresponding one of the interactive voice response systems. The method further can include receiving a call from the caller and receiving an input from the caller over the call. In one embodiment of the present invention, the input can identify one or more services and corresponding interactive voice response systems. Accordingly, the interactive voice response system corresponding to the identified service can be accessed on behalf of the caller. Information from the interactive voice response system can be retrieved and provided to the caller.

In another embodiment of the present invention, the service information can include login information for each of the services. In that case, the accessing step can include logging on to one or more of the interactive voice response systems. The service information further can specify instructions for navigating an interactive voice response menu hierarchy for one or more of the services. Also, the caller input can specify a caller query for information to be retrieved from one or more of the services. Accordingly, the accessing step can include submitting the caller query to one or more of the services.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
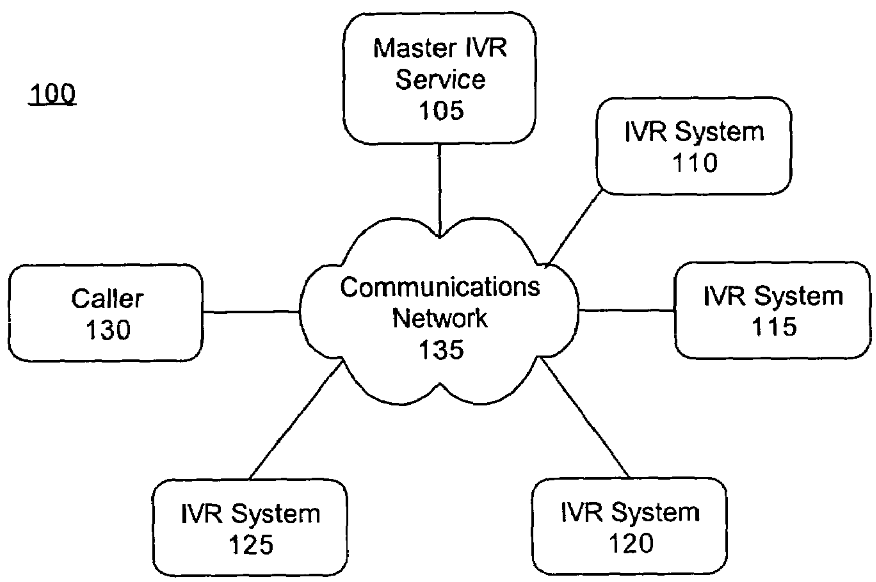
FIG. 1 is a schematic diagram illustrating a system for aggregating interactive voice response (IVR) systems in accordance with the inventive arrangements disclosed herein.

FIG. 1 is a schematic diagram illustrating a system 100 for aggregating interactive voice response (IVR) systems in accordance with the inventive arrangements disclosed herein. As shown, the system 100 can include a master IVR service 105 and one or more IVR systems 110, 115, 120, and 125, each of which can be implemented as a separate network element, communicatively linked via a communi cations network 135. The communications network 135 can be implemented as, or include, a Wide Area Network (WAN), a Local Area Network (LAN), the Public Switched Telephone Network (PSTN), the Internet, an intranet, wireless telephony networks, Internet Protocol (IP) telephony, Session Initiation Protocol (SIP) networks, and the like.

While one or more of the network elements can be co-located, according to one embodiment of the present invention, each of the IVR systems 110–125, as well as the master IVR service 105, can be remotely located from one another. The IVR systems 110–125, as well as the master IVR system 105, can be implemented as software programs executing within information processing systems. Each information processing system can include an appropriate telephony interface for performing call control functions including, but not limited to, receiving inbound calls, initiating outbound telephone calls, as well as call transfers, and the like.

The IVR systems 110–125 can serve as front end interfaces for information processing systems. Each IVR system 110–125 can implement one or more caller services. As such, the IVR systems 110–125 can receive input in the form of caller speech and/or touch-tones, either or both of which can be received over an established telephone call. For example, each IVR system 110–125 can include or access a speech recognition system (SRS) for converting caller speech to text as well as one or more recorded audio prompts that can be played to callers. The IVR systems 110–125 also can include suitable text-to-speech (TTS) systems rather than prerecorded audio prompts or a combination of both. In any case, the IVR systems 110–125 can be accessed via a caller 130, or in this case the master IVR service 105, by placing a telephone call to a telephone number corresponding to the caller selected IVR system.

The master IVR service 105 can be implemented as a separate IVR system through which the caller 130 can access each of the other IVR systems 110–125. While the master IVR service 105 can function in similar fashion as the other IVR systems 110–125 in that the IVR service 105 can receive calls, initiate outbound calls, transfer calls, and process caller speech and/or touch tone input, the master IVR service 105 also can be programmed to contact each of the IVR systems 110–125 on behalf of the caller 130. The master IVR system 105 can serve as an interface between the caller 130 and the IVR systems 110–125 such that caller queries can be forwarded to a selected IVR system 110–125and responses provided by one of the IVR systems 110–125 can be provided back to the master IVR service 105 to be provided back or played to the caller 130.

Figure 2:
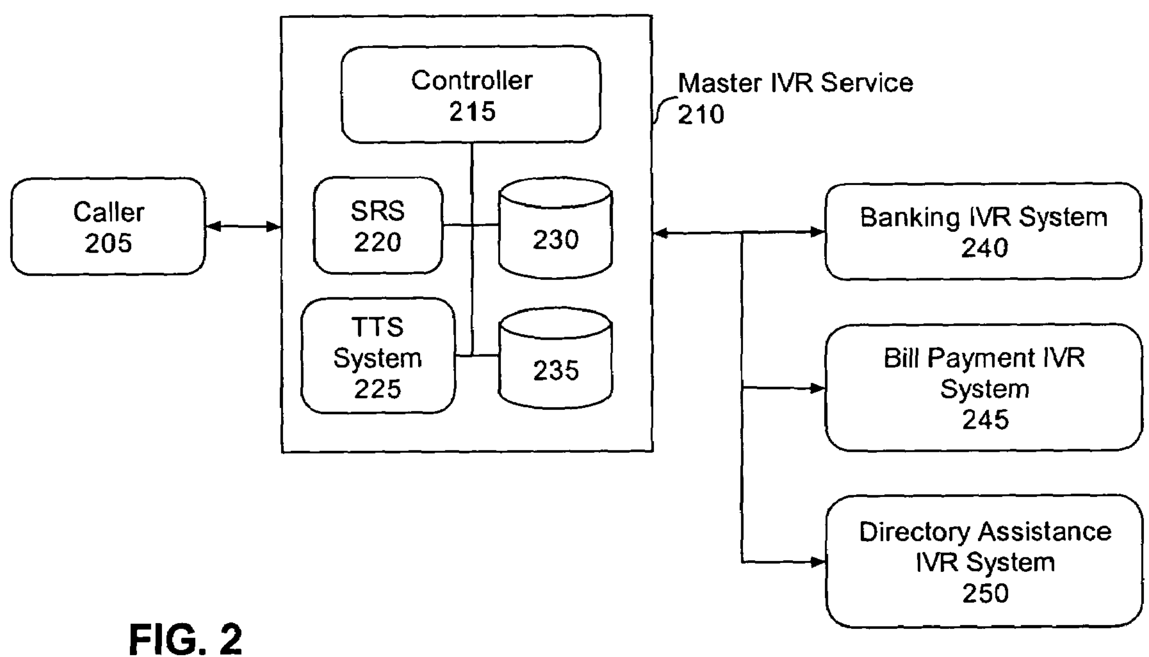
FIG. 2 is a schematic diagram illustrating another system for aggregating IVR systems in accordance with the inventive arrangements disclosed herein.

FIG. 2 is a schematic diagram illustrating an exemplary system implementation 200 for aggregating IVR systems in accordance with the inventive arrangements disclosed herein. The system 200 can include a master IVR service 210, a banking IVR system 240, a bill payment IVR system 245, and a directory assistance IVR system 250.

The master IVR service 210 can include a controller 215, a SRS 220, a TTS system 225, an audio data store 230, and a caller profile data store 235. The SRS 220 can receive spoken utterances, for example speech received over an established telephone call, and convert the utterances to text. The TTS system 225 can generate audible prompts from input text. The audio data store 230 can include recorded audio prompts as well as recorded caller speech to be used within an input sequence to be provided to one of the IVR systems 240–250, or to be played to a caller 230.

The caller profile data store 235 can store caller profiles for each registered caller. Each caller profile can store service information including, but not limited to, one or more IVR system access numbers for registered IVR systems, as well as account numbers, passwords, or other caller identifying information needed by the master IVR service 210 for accessing or logging on to other IVR systems on behalf of the caller 205.

Service information within caller profiles also can include instructions for navigating menu hierarchies for each registered IVR system, for example IVR systems 240–250. Each set of instructions can include a series of one or more inputs, whether touch tones, recorded caller speech, commands for generating TTS system 225 generated speech, or any combination thereof, which correspond to menu selections for navigating a menu hierarchy of a registered IVR system. The caller 205 can enter a sequence of inputs for accessing one or more features of a registered IVR system. Each sequence can be stored as a selection in the master IVR service 210, which can be selected by the caller 205. For example, the caller profile can include an input sequence for accessing the caller's 205 checking account balance from the banking IVR system 240, an input sequence for paying a particular bill on the bill payment IVR system 245, as well as an input sequence for looking up or dialing one or more telephone numbers through the directory assistance IVR system 250.

The caller 205 can choose the programmed selections thereby causing the master IVR service 210 to provide the input sequence to the proper IVR system to retrieve information desired by the caller 205. Accordingly, once the input sequence for a function of a registered IVR system is programmed into the master IVR service 210, the caller 205 need not manually enter that input sequence when the caller 205 wishes to access the function.

The controller 215 can control telephony call control functions, for example by controlling one or more telephony interfaces (not shown) of the master IVR service 210. As such, the controller 215 can instruct the telephony interface to answer inbound telephone calls to the master IVR service 210, initiate outbound telephone calls, transfer calls, process touch tone input, and generate touch tone output.

According to one embodiment, the controller 215 can join two calls in progress. More particularly, after answering a telephone call from the caller 205 and initiating an outbound call with a selected IVR system, the controller 215 can instruct the telephony interface to join the two calls thereby removing the master IVR service 210 from the call chain such that the caller 205 remains connected with the selected IVR system. Still, the controller 215 can cause the master IVR service 210 to serve as a pass-through between the IVR system and the caller 205 where caller 205 input passes through the master IVR service 210 to a selected IVR system and the IVR system response passes through the master IVR service 210 to the caller 205.

The controller 215 also can control and coordinate the operation of the SRS 220 and the TTS system 225. The controller 215 can route caller 205 speech received over a telephony link to the SRS 220, as well as route audio from the TTS system 225 to the caller 205 and/or one or more of the IVR systems 240–250 over a telephony link. Similarly, the controller 210 can access the audio data store 230 to retrieve needed audio prompts and play those audio prompts to the caller 205 and/or one or more of the IVR systems 240–250. The controller 215 also can access the caller profile data store 235 to create, delete, read, and write caller profiles.

While the master IVR service 210 is depicted as including the SRS 220, the TTS system 225, and data stores 230 and 235, those skilled in the art will recognize that one or more of the components can be distributed across a network. For example, the master IVR service 210 can be configured without the SRS 220 such that the master IVR service 210 accesses a remote SRS for speech recognition tasks. Similarly, the master IVR service 210 can be configured to utilize either recorded prompts or TTS technology. In either case, the audio data store 230 and/or the TTS system 225 also can be remotely located from the master IVR service 210.

In operation, the caller 205 can register with the IVR service 210 and provide necessary access information for each of the respective IVR systems 240–250. When the caller 205 requires information from one or more of the IVR systems 240–250, the caller 205 need only place a telephone call to the master IVR service 210. Once logged onto the master IVR service 210 over an established telephony link, the caller 205 can instruct the master IVR service 210 to place an outgoing telephone call to a selected IVR system 240–250. While the caller 205 can be transferred to the selected IVR system, according to one embodiment of the present invention, the master IVR service 210 can remain in the telephony call chain.

For example, after logging onto the master IVR service 210, the caller 205 can select IVR system 240. The caller 205, having uploaded various inputs such as speech, key sequences for navigating the IVR system 240, text to be played by the TTS system 225, or instructions for the TTS system 225 to play speech, can instruct the master IVR service 210 to call the IVR system 215. Once the call is established, the master IVR service 210 can transmit the caller's 205 account information, user ID, password, and/or other necessary information for logging the caller 205 on to the IVR system 240. The master IVR service 210 further can provide a programmed input sequence as specified by the caller 205 to the IVR system 240. Response information determined by the IVR system 240 can be provided back to the master IVR service 210. The master IVR service 210 then can relay the information to the caller 205 over the established telephony link.

Figure 3:
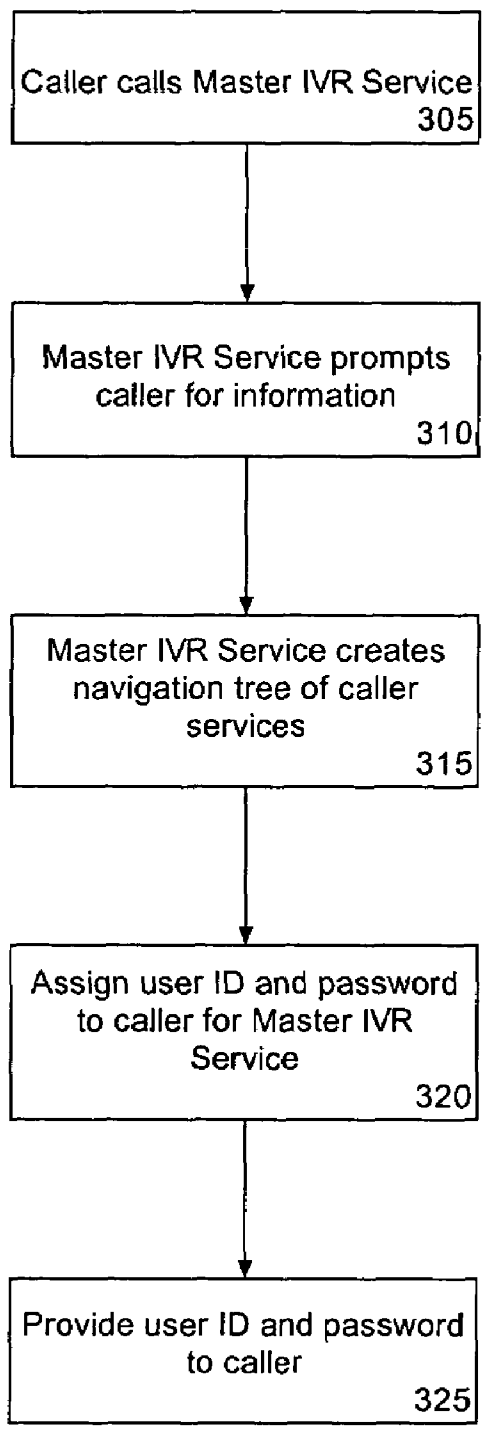
FIG. 3 is a flow chart illustrating a method of registering a caller with a master IVR service configured to aggregate services from one or more IVR systems in accordance with the inventive arrangements disclosed herein.

FIG. 3 is a flow chart illustrating a method 300 of registering a caller with a master IVR service configured to aggregate services from one or more IVR systems in accordance with the inventive arrangements disclosed herein. The method 300 can begin in step 305 where a caller or subscriber of the master IVR service places a telephone call to the master IVR service.

Once a telephone call is established between the caller and the master IVR service, in step 310, the master IVR service can begin audibly prompting the caller for information. For example, the IVR service can begin asking the caller to register one or more different IVR systems with which the caller interacts or wishes to interact through the master IVR service. The caller can be audibly prompted for information such as the names of each IVR system or service, access telephone numbers for each IVR system, the relevant account numbers or other identifiers used to gain access to the caller's information through each IVR system, as well as any other information, including passwords, that may be required. The requested information can be provided by the caller through touch tone and/or speech inputs.

In one embodiment of the present invention, the master IVR service also can query the caller for instructions for navigating menu hierarchies for each registered IVR system. Thus, the caller can specify one or more input sequences, whether touch tone inputs, recorded caller speech, keyed in text to be played by the TTS system, commands for the TTS system to play speech, or any combination thereof, for accessing functions that are routinely used by the caller. For example, if the caller accesses account balance information on a routine basis, the caller can provide the master IVR service with the input sequence necessary to instruct the banking IVR system to provide the caller's balance information. The caller can provide as many sets of instructions as desired or as memory permits.

In step 315, the master IVR service can store the received information and create a navigation tree of the caller's services. That is, the master IVR service can create a data structure describing each IVR system for which the caller has provided information, including instructions for IVR menu navigation. In step 320, the master IVR service can create a user identifier (ID) and password with which the caller can access and log on to the master IVR service. Using the generated user ID and password, the caller can access any of the IVR systems that have been registered with the master IVR service. In step 325, the master IVR service can provide the generated user ID and password to the caller.

In another embodiment of the present invention, the caller can be provided with a programming tool for registering IVR systems. The tool can facilitate the caller's ability to provide IVR system information including instructions for navigating IVR system menu hierarchies. The IVR system registration information specified by the caller then can be uploaded or imported into the master IVR service. For example, the caller can be provided with a standalone program that can be executed on a computing device allowing the caller to specify sequences of touch tones and/or speech inputs as well as other data for specifying queries for the IVR systems that the caller has registered with the master IVR service. In another embodiment, such a tool can be provided as a Web site through which the caller can interact to specify such menu hierarchies and queries. In either case, the resulting data can be provided or uploaded to the master IVR service.

Figure 4:
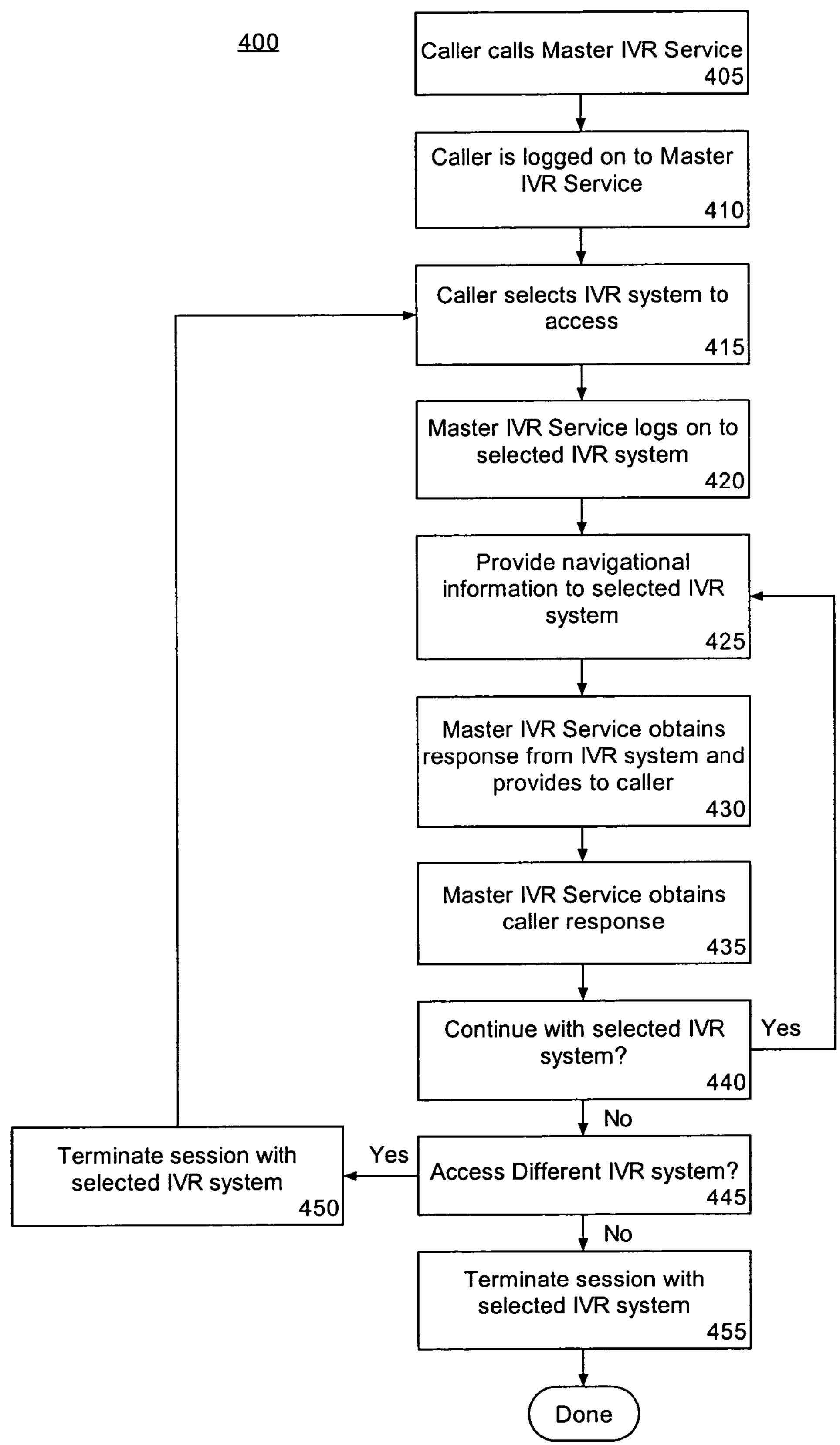
FIG. 4 is a flow chart illustrating a method of providing master IVR services to a caller in accordance with the inventive arrangements disclosed herein.

FIG. 4 is a flow chart illustrating a method 400 of providing master IVR services to a caller in accordance with the inventive arrangements disclosed herein. The method can begin in a state where the caller has already registered with the master IVR service as described with reference to FIG. 3. Accordingly, the method 400 can begin in step 405 where the caller can initiate a telephone call to the master IVR service.

Once a call is established, in step 410, the caller can log on to the master IVR service. The caller, having previously registered with the master IVR service, can provide a caller specific user ID and password for accessing the master IVR service. After logging on, in step 415, the caller can indicate which of the registered IVR systems the caller wishes to access. For example, the caller can be prompted to select a particular IVR system that the caller has previously registered with the master IVR service. In this case the caller can select an option corresponding to a banking IVR system.

In step 420, the master IVR service can log on to the caller selected IVR system. Taking the previous example, the master IVR service can place an outgoing call to the banking IVR system. The master IVR service then can provide account information, a user ID, password, and/or any other information necessary for the master IVR service to log on to the banking IVR system on behalf of the caller. As noted, the necessary log on information can be accessed from the caller's profile stored in the master IVR service. Notably, the master IVR service can remain on line as a party to the telephone call. That is, the caller can be connected to the specified IVR system through the master IVR service.

In step 425, the master IVR service can provide navigational information to the IVR system. In particular, the master IVR service can provide instructions for navigating a menu hierarchy of the IVR system. The instructions can specify one or more inputs for instructing the selected IVR system to navigate to a particular menu location or option for performing a task. The instructions can specify a caller query or a caller query can be provided by the caller after the desired option of the IVR system has been reached. Continuing with the previous example, the caller can request that the master IVR service transmit an input sequence causing the banking IVR system to retrieve an account balance. Once the input sequence is sent, the banking IVR system can navigate to the menu location specified by the received inputs. The task specified by the menu location can then be performed.

In step 430, the IVR system can provide the requested information to the master IVR service. The master IVR service then can forward the received information to the caller. As the retrieved information is provided as an audible response, the response can be provided directly to the caller as the master IVR service remains connected to both the caller and the IVR system. For example, the requested banking balance information, sent by the banking IVR system, can be passed on to the caller via the master IVR service.

In step 435, the master IVR service can receive a response from the caller. In step 440, from the caller response, the master IVR service can determine whether the caller wishes to continue accessing the selected or current IVR system. If so, the method can proceed to step 425 where the caller again can select navigational information to be sent to the selected IVR system from the master IVR service. If not, the method can proceed to step 445.

In step 445, the master IVR service can determine whether the caller wishes to access a different IVR system, for example by prompting the caller. If so, the method can proceed to step 450 where the session with the current or selected IVR system can be terminated. The method then can continue to step 415 to access another caller selected IVR system.

If the caller does not wish to access another IVR system, the method can proceed to step 455 where the session with the current IVR system can be terminated. The method then can end. It should be appreciated by those skilled in the art that while the method 400 illustrates one embodiment of the present invention, the present invention is not so limited. Rather, callers can interact with the master IVR system 400 in a variety of different ways such that the ordering of the steps need not be carried out exactly as described. For example, each caller response can be solicited by a corresponding master IVR service prompt, or a prompt from an IVR system that is relayed to the caller via the master IVR service. Further, caller responses can preempt solicitations by the IVR systems or the master IVR service.

According to one embodiment, the present invention can provide an option allowing the caller to access an introductory set of menu selections for an accessed IVR system. For example, caller profiles stored in the master IVR service can include an option that, responsive to a caller selection, causes the master IVR service to send an accessed IVR system one or more inputs instructing the selected IVR system to navigate to an introductory menu location. This allows the caller to begin navigating the accessed IVR system from the beginning of the menu hierarchy as if the caller had initiated the call without the aid of the master IVR service. The caller can assume full control over navigating the IVR system menu, providing individual inputs in serial fashion as if the caller had not initiated contact through the master IVR service. Such a feature can be useful, for example, in cases where the caller wishes to access an IVR system option that has not yet been programmed into the master IVR service.

In another embodiment of the present invention, after causing a selected IVR system to navigate to an introductory set of options, the master IVR service can transfer the call such that the master IVR service is no longer in the connection path between the caller and the selected IVR system.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of aggregating interactive voice response services from a plurality of interactive voice response systems comprising:

for at least one caller, storing within a master interactive voice response system caller-specific service information for accessing and interacting with a plurality of different interactive voice response systems that each provide at least one service, wherein the master interactive voice response system responds to a single caller-supplied input by forwarding a composite query corresponding to a sequentially related set of commands from the at least one caller to at least one of the plurality of interactive voice response systems, the sequentially related set of commands causing the at least one interactive voice response system to execute at least one service through a sequence of queries and responses based upon the caller-specific service information;

receiving a call from the caller to the master interactive voice response system;

receiving an input from the caller over the call to the master interactive voice response system, wherein the input identifies at least one of the plurality of services and corresponding interactive voice response systems;

accessing the interactive voice response system corresponding to the identified service through the master interactive voice response system on behalf of the caller;

submitting the composite query from the at least one caller to the interactive voice response system;

retrieving information from the interactive voice response system with the master interactive voice response system; and providing the retrieved information to the caller from the master interactive voice response system.

2. The method of claim 1, wherein said service information includes login information for each of said plurality of services, said accessing step comprising logging on to the at least one interactive voice response system.

3. The method of claim 1, wherein said service information specifies pre-stored sequentially related instructions for navigating an interactive voice response menu hierarchy for at least one of the services.

4. The method of claim 1, wherein said input further specifies a composite sequentially related caller query for information to be retrieved from at least one of the plurality of services, said accessing step further comprising submitting the composite sequentially related caller query to the at least one of the plurality of services.

5. A system for aggregating interactive voice response services from a plurality of interactive voice response systems comprising:

means for storing within a master interactive voice response system caller-specific service information for accessing and interacting with a plurality of different interactive voice response systems that each provide at least one service, wherein the master interactive voice response system is configured to respond to a single caller-supplied input by forwarding a composite query corresponding to a sequentially related set of commands from at least one caller to at least one of the plurality of interactive voice response systems, the sequentially related set of commands causing the at least one interactive voice response system to execute at least one service through a sequence of queries and responses based upon the caller-specific service information;

means for receiving a call from the caller;

means for receiving an input from the caller over the call, wherein the input identifies at least one of the plurality of services and corresponding interactive voice response systems;

means for accessing the interactive voice response system corresponding to the identified service on behalf of the caller;

means for submitting the composite query from the at least one caller to the interactive voice response system;

means for retrieving information from the interactive voice response system; and means for providing the retrieved information to the caller.

6. A machine readable storage, having stored thereon a computer program having a plurality of code sections executable by a machine for causing the machine to perform the steps of:

for at least one caller, storing within a master interactive voice response system caller-specific service information for accessing and interacting with a plurality of different interactive voice response systems that each provide at least one service wherein the master interactive voice response system responds to a single caller-supplied input by forwarding a composite query corresponding to a sequentially related set of commands from the at least one caller to at least one of the plurality of interactive voice response systems, the sequentially related set of commands causing the at least one interactive voice response system to execute at least one service through a sequence of queries and responses based upon the caller-specific service information;

receiving a call from the caller to the master interactive voice response system;

receiving an input from the caller over the call to the master interactive voice response system, wherein the input identifies at least one of the plurality of services and corresponding interactive voice response systems;

accessing the interactive voice response system corresponding to the identified service through the master interactive voice response system on behalf of the caller;

submitting the composite query from the at least one caller to the interactive voice response system;

retrieving information from the interactive voice response system with the master interactive voice response system; and providing the retrieved information to the caller from the master interactive voice response system.

7. The machine readable storage of claim 6, wherein said service information includes login information for each of said plurality of services, said accessing step comprising logging on to the at least one interactive voice response system.

8. The machine readable storage of claim 6, wherein said service information specifies pre-stored sequentially related instructions for navigating an interactive voice response menu hierarchy for at least one of the services.

9. The machine readable storage of claim 6, wherein said input further specifies a composite sequentially related caller query for information to be retrieved from at least one of the plurality of services, said accessing step further comprising submitting the composite sequentially related caller query to the at least one of the plurality of services.

* * * * *